United States Patent
Ertas et al.

(10) Patent No.: US 10,001,166 B2
(45) Date of Patent: Jun. 19, 2018

(54) GAS DISTRIBUTION LABYRINTH FOR BEARING PAD

(71) Applicant: General Electric Company, Schenectady, NY (US)

(72) Inventors: Bugra Han Ertas, Niskayuna, NY (US); Joshua Tyler Mook, Loveland, OH (US); Jason Joseph Bellardi, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/131,081

(22) Filed: Apr. 18, 2016

(65) Prior Publication Data

US 2017/0298987 A1    Oct. 19, 2017

(51) Int. Cl.
*F16C 32/06*    (2006.01)
*F16C 17/02*    (2006.01)
(Continued)

(52) U.S. Cl.
CPC .......... *F16C 32/0622* (2013.01); *F16C 17/02* (2013.01); *F16C 17/035* (2013.01);
(Continued)

(58) Field of Classification Search
CPC ...... F16C 17/035; F16C 27/02; F16C 27/063; F16C 32/0666; F16C 2360/23;
(Continued)

(56) References Cited

U.S. PATENT DOCUMENTS

| 2,972,504 A | 2/1961 | Baker |
| 3,004,804 A | 10/1961 | Pinkus et al. |

(Continued)

FOREIGN PATENT DOCUMENTS

| CH | 550340 A | 6/1974 |
| EP | 0642130 A2 | 3/1995 |

(Continued)

OTHER PUBLICATIONS

Dellacorte et al., "Load Capacity Estimation of Foil Air Journal Bearings for Oil-Free Turbomachinery Applications", Tribology Transactions, Taylor & Francis Online, vol. No. 43, Issue No. 4, pp. 795-801, 2000.

(Continued)

*Primary Examiner* — Alan B Waits
(74) *Attorney, Agent, or Firm* — GE Global Patent Operation; Nitin Joshi

(57) ABSTRACT

The present disclosure is directed to a bearing assembly for a gas turbine engine. The bearing assembly includes a bearing housing and a bearing pad for supporting a rotary component of the gas turbine engine. The bearing pad includes at least one gas inlet and a plurality of gas outlets configured on an inner surface thereof. The gas inlet is in fluid communication with the plurality of gas outlets via a gas distribution labyrinth. Further, the gas distribution labyrinth includes a plurality of passageways configured to evenly distribute pressurized gas entering the gas inlet to an interface between the inner surface of the bearing pad and an outer diameter of the rotary component.

17 Claims, 10 Drawing Sheets

(51) Int. Cl.
| | |
|---|---|
| *F16C 33/10* | (2006.01) |
| *F16C 17/03* | (2006.01) |
| *F16C 33/14* | (2006.01) |
| *B33Y 10/00* | (2015.01) |

(52) U.S. Cl.
CPC ........ *F16C 32/067* (2013.01); *F16C 32/0666* (2013.01); *F16C 33/108* (2013.01); *F16C 33/1015* (2013.01); *F16C 33/14* (2013.01); *B33Y 10/00* (2014.12); *F16C 2220/24* (2013.01); *F16C 2360/23* (2013.01)

(58) Field of Classification Search
CPC .... F16C 33/1015; F16C 33/108; F16C 33/14; F16C 33/101; F16C 32/06; F16C 32/0603; F16C 32/0614; F16C 32/0622; F16C 32/067; F16C 17/02; F16C 2220/24; F16F 15/0235; F16F 15/162; F01D 25/164; B33Y 10/00

See application file for complete search history.

(56) References Cited

U.S. PATENT DOCUMENTS

| | | | |
|---|---|---|---|
| 3,110,526 A | | 11/1963 | Sternlicht |
| 3,351,394 A | * | 11/1967 | Hooker .................. F16C 17/03 384/108 |
| 3,620,581 A | * | 11/1971 | Heller ................. F16C 32/0666 384/100 |
| 3,721,479 A | | 3/1973 | Rasnick et al. |
| 3,863,996 A | | 2/1975 | Raimondi |
| 3,891,281 A | | 6/1975 | Jenness |
| 3,898,793 A | | 8/1975 | Nakamura et al. |
| 3,944,304 A | | 3/1976 | Purtschert |
| 3,994,541 A | | 11/1976 | Geary et al. |
| 4,226,483 A | | 10/1980 | Yamamoto |
| 4,262,975 A | | 4/1981 | Heshmat et al. |
| 4,410,220 A | | 10/1983 | Robinson |
| 4,632,574 A | * | 12/1986 | Wilson ................ C03B 23/045 384/100 |
| 4,743,125 A | | 5/1988 | Dammel et al. |
| 4,793,722 A | | 12/1988 | Jensen |
| 4,872,767 A | | 10/1989 | Knapp |
| 4,921,229 A | | 5/1990 | Hori |
| 4,971,458 A | | 11/1990 | Carlson |
| 5,044,781 A | | 9/1991 | Werner |
| 5,085,521 A | | 2/1992 | Singh |
| 5,149,206 A | | 9/1992 | Bobo |
| 5,222,815 A | | 6/1993 | Ide |
| 5,328,408 A | | 7/1994 | Wolf et al. |
| 5,360,273 A | * | 11/1994 | Buckmann ............. F01D 25/22 384/117 |
| 5,374,129 A | | 12/1994 | Vohr et al. |
| 5,380,100 A | | 1/1995 | Yu |
| 5,421,655 A | | 6/1995 | Ide |
| 5,501,531 A | | 3/1996 | Hamaekers |
| 5,603,574 A | | 2/1997 | Ide |
| 5,743,654 A | * | 4/1998 | Ide ....................... F01D 25/164 384/100 |
| 6,019,515 A | | 2/2000 | Fujii et al. |
| 6,169,332 B1 | | 1/2001 | Taylor et al. |
| 6,308,810 B1 | | 10/2001 | Kuwayama |
| 6,536,565 B2 | | 3/2003 | Oliver et al. |
| 6,679,045 B2 | | 1/2004 | Karafillis et al. |
| 6,700,747 B2 | | 3/2004 | Matz |
| 6,883,967 B2 | | 4/2005 | Robb |
| 7,290,931 B2 | * | 11/2007 | Wardman .............. F16C 29/025 384/12 |
| 7,394,076 B2 | | 7/2008 | Devitt |
| 7,431,504 B1 | | 10/2008 | Pelfrey |
| 7,517,152 B1 | | 4/2009 | Walsh |
| 7,607,647 B2 | * | 10/2009 | Zhao ................... B25B 11/005 269/20 |
| 7,625,121 B2 | | 12/2009 | Pettinato et al. |
| 7,628,542 B2 | | 12/2009 | Wada et al. |
| 7,896,550 B1 | | 3/2011 | Pinera et al. |
| 7,987,599 B2 | | 8/2011 | Mavrosakis |
| 8,083,413 B2 | * | 12/2011 | Ertas ..................... F16C 17/035 384/117 |
| 8,118,570 B2 | | 2/2012 | Meacham et al. |
| 8,146,369 B2 | | 4/2012 | Walitzki et al. |
| 8,206,039 B2 | | 6/2012 | Maier |
| 8,209,834 B2 | | 7/2012 | Mons et al. |
| 8,240,919 B2 | * | 8/2012 | Hirata ..................... F16C 13/04 384/100 |
| 8,256,750 B2 | | 9/2012 | Cottrell et al. |
| 8,272,786 B2 | | 9/2012 | Cottrell |
| 8,342,796 B2 | | 1/2013 | Spencer et al. |
| 8,591,117 B2 | | 11/2013 | Giraud et al. |
| 8,702,311 B2 | | 4/2014 | Matsuo et al. |
| 8,720,205 B2 | | 5/2014 | Lugg |
| 8,796,893 B2 | * | 8/2014 | Muth ..................... A61B 6/035 310/156.01 |
| 8,814,437 B2 | | 8/2014 | Braun |
| 8,834,027 B2 | | 9/2014 | Zeidan |
| 8,998,492 B2 | | 4/2015 | Bertea |
| 9,046,001 B2 | | 6/2015 | Hindle et al. |
| 9,121,448 B2 | | 9/2015 | Delgado Marquez et al. |
| 9,169,846 B2 | | 10/2015 | Mariotti |
| 9,297,438 B2 | | 3/2016 | Meacham et al. |
| 2005/0008269 A1 | | 1/2005 | Akutsu et al. |
| 2006/0054660 A1 | | 3/2006 | Chappell |
| 2013/0216174 A1 | | 8/2013 | Braun |
| 2014/0140645 A1 | | 5/2014 | Meacham et al. |
| 2014/0154058 A1 | | 6/2014 | Meacham et al. |
| 2014/0286599 A1 | | 9/2014 | Devitt et al. |
| 2015/0104123 A1 | * | 4/2015 | Ertas ..................... F01D 25/164 384/119 |
| 2015/0104124 A1 | * | 4/2015 | Delgado Marquez ............................. F01D 25/166 384/119 |
| 2015/0275967 A1 | | 10/2015 | Ryu |

FOREIGN PATENT DOCUMENTS

| | | |
|---|---|---|
| EP | 2853759 A1 | 4/2015 |
| JP | 2001050267 A | 2/2001 |
| JP | 2009030704 A | 2/2009 |
| JP | 2012092969 A | 5/2012 |

OTHER PUBLICATIONS

Andres, "Hybrid Flexure Pivot-Tilting Pad Gas Bearings: Analysis and Experimental Validation", Journal of Tribology, ASME, vol. No. 128, Issue No. 3, 551-558, Mar. 1, 2006.

Gu et al., "Laser additive manufacturing of metallic components: materials, processes and mechanisms", International Materials Reviews, Maney Online, vol. No. 57, Issue No. 3, pp. 133-164, May 2012.

U.S. Notice of Allowance issued in connection with related U.S. Appl. No. 14/566,798 dated Apr. 26, 2016.

GE Related Case Form.

Gunter et al., "Design of Nonlinear Squeeze-Film Dampers for Aircraft Engines", Journal of Lubrication Technology, vol. No. 99, Issue No. 01, pp. 57-64, Mar. 10, 1976.

Heshmat et al., "Analysis of Gas-Lubricated Foil Journal Bearings", Journal of Lubrication Technology, vol. No. 105, Issue No. 4, pp. 647-655, Oct. 1, 1983.

Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.

U.S. Non-Final Office Action issued in connection with related U.S. Appl. No. 15/131,113 dated Nov. 17, 2016.

U.S. Non-Final Rejection issued in connection with related U.S. Appl. No. 15/131,136 dated May 8, 2017.

(56) References Cited

OTHER PUBLICATIONS

European Search Report and Opinion Issued in connection with Corresponding EP Application No. 17165709.1 dated May 31, 2017.

* cited by examiner

GAS DISTRIBUTION LABYRINTH FOR BEARING PAD

FIELD OF THE INVENTION

The present subject matter relates generally to a bearing assembly, and more particularly to a gas distribution labyrinth for a bearing pad of a bearing assembly that may be used in a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements required for optimal operation under given operating conditions. These rotor assemblies have a mass generating a constant static force due to gravity, and also generate a dynamic force due to, e.g., imbalances in the rotor assembly during operation. Such gas turbine engines include bearing assemblies to sustain and support these forces while permitting rotation of the rotor assembly. A typical bearing assembly includes a bearing housed within a bearing housing and a bearing pad configured between the bearing and the shafts.

At least some known rotary machines use gas bearings where non-oil lubricated bearings are desired. However, for successful operation, gas bearings must address typical mission cycle loads. In most cases, the shaft movement (i.e. due to static/dynamic loads) with respect to the bearing mounting surfaces is misaligned and/or angled. Therefore, force distribution on the bearing pad is non-uniform and can lead to edge loading, which can potentially damage the bearing assembly. In an effort to mitigate edge loading effects of the bearing pad and generate better load capacity, a distributed gas delivery orifice map is required, rather than a centered pressurization system indicative of most gas bearing designs. Furthermore, the orifice map must be efficiently connected to the primary gas delivery duct in the bearing housing.

In view of the aforementioned, a bearing pad having an internal gas distribution labyrinth would be welcome in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a bearing assembly for a gas turbine engine. The bearing assembly includes a bearing housing and a bearing pad for supporting a rotary component of the gas turbine engine. The bearing pad includes at least one gas inlet configured on an outer surface of the pad and a plurality of gas outlets configured on an inner surface of the pad. Further, the gas inlet is in fluid communication with the plurality of gas outlets via a gas distribution labyrinth. Thus, the gas distribution labyrinth includes a plurality of passageways configured to evenly distribute pressurized gas entering the gas inlet to an interface between the inner surface of the bearing pad and an outer diameter of the rotary component.

In one embodiment, the gas distribution labyrinth may define any suitable predetermined pattern, including but not limited to a zig-zag pattern, a grid pattern, or any other suitable pattern configured to evenly distribute the pressurized gas. In another embodiment, the gas outlets may be evenly spaced on the inner surface of the bearing pad. Alternatively, the gas outlets may be randomly spaced on the inner surface of the bearing pad.

In further embodiments, the bearing pad may be attached to the bearing housing. Alternatively, the bearing pad and the bearing housing may be formed integrally of a single, continuous material. More specifically, in certain embodiments, the bearing pad and the bearing housing may be formed using an additive manufacturing process.

In additional embodiments, the bearing assembly may also include an external gas delivery source configured to deliver the pressurized gas to the gas inlet.

In yet another embodiment, the bearing housing may include a plurality of bearing pads spaced along a circumferential direction of the bearing housing.

In still a further embodiment, the bearing housing may include a column extending towards the bearing pad for providing the gas inlet of the bearing pad with the pressurized gas. In such embodiments, the column may define an inner channel for providing the gas inlet of the bearing pad with the pressurized gas and an outer channel concentric with the inner channel.

In further embodiments, the gas turbine engine may be an aircraft gas turbine engine.

In another aspect, the present disclosure is directed to a bearing pad for a bearing assembly of a gas turbine engine. The bearing pad includes at least one gas inlet configured on an outer surface of the bearing pad, a plurality of gas outlets configured on an inner surface of the bearing pad, and a gas distribution labyrinth. Further, the gas inlet is in fluid communication with the plurality of gas outlets via the gas distribution labyrinth. The gas distribution labyrinth includes a plurality of passageways configured to evenly distribute pressurized gas entering the gas inlet to an interface between the inner surface of the bearing pad and an outer diameter of the rotary component. It should be understood that the bearing pad may further include any of the additional features as described herein.

In yet another aspect, the present disclosure is directed to a gas turbine engine assembly. The gas turbine engine assembly includes a rotary component, a bearing housing, and a bearing pad for supporting the rotary component. The bearing pad includes at least one gas inlet configured on an outer surface of the bearing pad and a plurality of gas outlets configured on an inner surface the bearing pad. Further, the gas inlet is in fluid communication with the plurality of gas outlets via a gas distribution labyrinth. The gas distribution labyrinth includes a plurality of passageways configured to evenly distribute pressurized gas entering the gas inlet to an interface between the inner surface of the bearing pad and an outer diameter of the rotary component. Further, the gas turbine engine assembly includes an external gas delivery source configured to deliver the pressurized gas to the gas inlet.

In one embodiment, the rotary component may include one or more rotating shafts of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
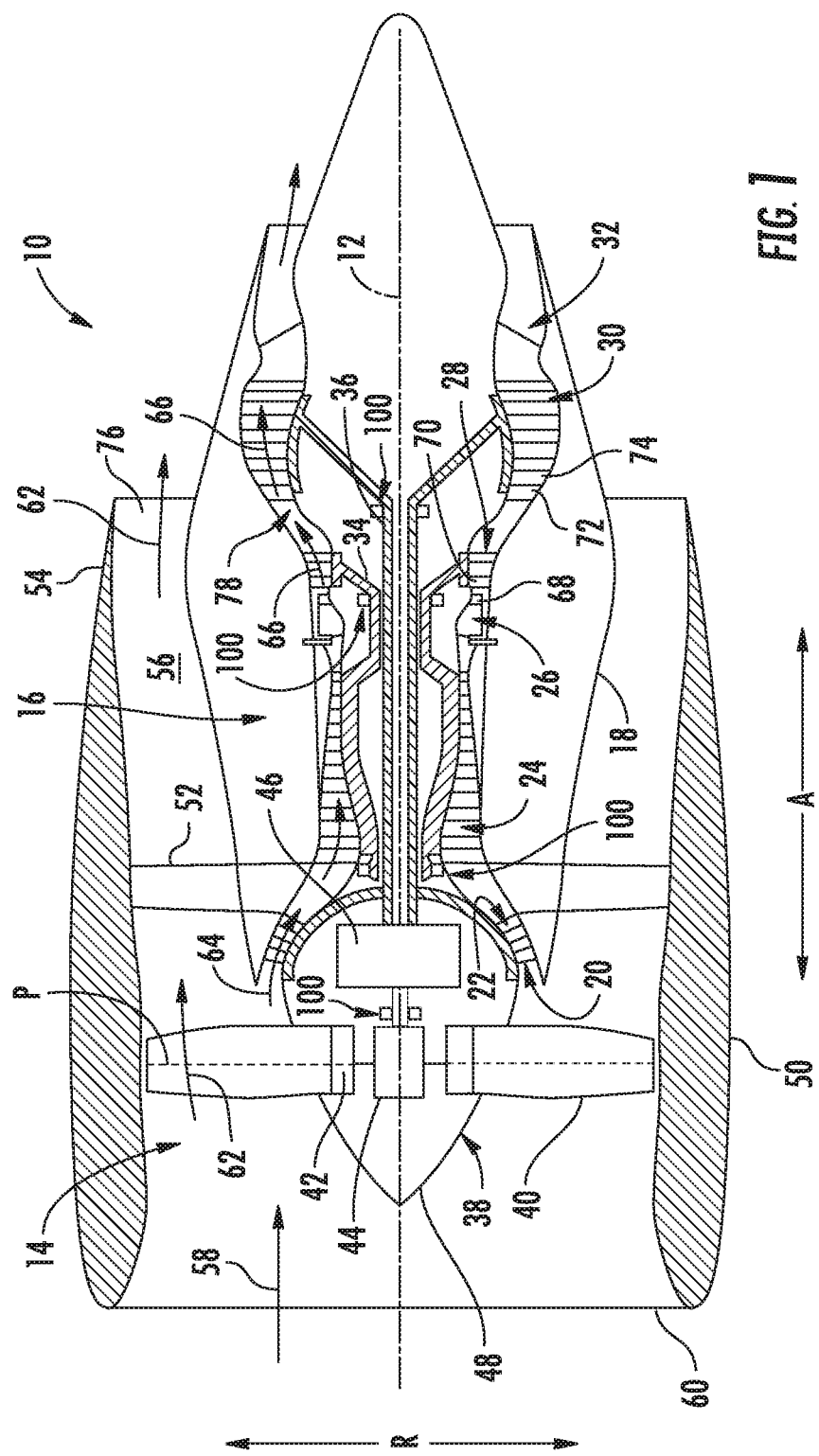
FIG. 1 illustrates a schematic cross-sectional view of one embodiment of a gas turbine engine according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a bearing assembly for a gas turbine engine. The bearing assembly includes a bearing housing and a bearing pad for supporting a rotary component of the gas turbine engine. The bearing pad includes at least one gas inlet on an outer surface of the pad and a plurality of gas outlets on an inner surface of the pad. Further, the gas inlet is in fluid communication with the plurality of gas outlets via a gas distribution labyrinth. Thus, the gas distribution labyrinth includes a plurality of passageways configured to evenly distribute pressurized gas entering the gas inlet to an interface between the inner surface of the bearing pad and an outer diameter of the rotary component.

Accordingly, the present disclosure provides many advantages not present in the prior art. For example, most conventional gas bearings have only one pressurization orifice hole located in the center of the pad, which is mainly due to limitations in manufacturing technologies that use conventional machining equipment like mills and lathes. In the cases where multiple orifices are located on the inner surface of the pad, cross drilling on the side of the pad is performed, which has disadvantages due to plugging requirements and increased radial space. Using advanced manufacturing, such as additive manufacturing, the gas distribution labyrinth can be generated without cross drilling or the use of plugs. Thus, the present disclosure provides a bearing pad having one gas entry duct which communicates with a gas distribution labyrinth, thereby enabling a distributed gas delivery to the bearing pad. Ultimately, the bearing pad of the present disclosure results in higher resiliency to angular misalignment, thereby preventing edge loading and hence improved load carrying capacity.

Referring now to the drawings, wherein identical numerals indicate the same elements throughout the figures, FIG. 1 illustrates one embodiment of a schematic cross-sectional view of a turbomachine according to the present disclosure. More particularly, for the embodiment of FIG. 1, the turbomachine is configured as a gas turbine engine 10, or rather as a high-bypass turbofan jet engine. As shown in FIG. 1, the gas turbine engine 10 defines an axial direction A1 (extending parallel to a longitudinal centerline 12 provided for reference), a radial direction R1, and a circumferential direction (not shown) extending about the axial direction A1. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP)

shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A1 during operation of the gas turbine engine 10.

In order to support such rotary components, the gas turbine engine includes a plurality of air bearing assemblies 100 attached to various structural components within the gas turbine engine 10. More specifically, in the illustrated embodiment, the bearing assemblies 100 facilitate rotation of the LP shaft 36 and the HP shaft 34 and dampen vibrational energy imparted to bearing assemblies 100 during operation of the gas turbine engine 10. Although the bearing assemblies 100 are described and illustrated as being located generally at forward and aft ends of the respective LP shaft 36 and HP shaft 34, the bearing assemblies 100 may additionally, or alternatively, be located at any desired location along the LP shaft 36 and HP shaft 34 including, but not limited to, central or mid-span regions of the shafts 34, 36, or other locations along shafts 34, 36 where the use of conventional bearing assemblies 100 would present significant design challenges. Further, the bearing assemblies 100 may be used in combination with conventional oil-lubricated bearing assemblies. For example, in one embodiment, conventional oil-lubricated bearing assemblies may be located at the ends of shafts 34, 36, and one or more bearing assemblies 100 may be located along central or mid-span regions of shafts 34, 36.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R1. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 10 by LP shaft 36 across a power gearbox 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the gas turbine engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the gas turbine engine 10 depicted in FIG. 1 is provided by way of example only, and that in other exemplary embodiments, the gas turbine engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
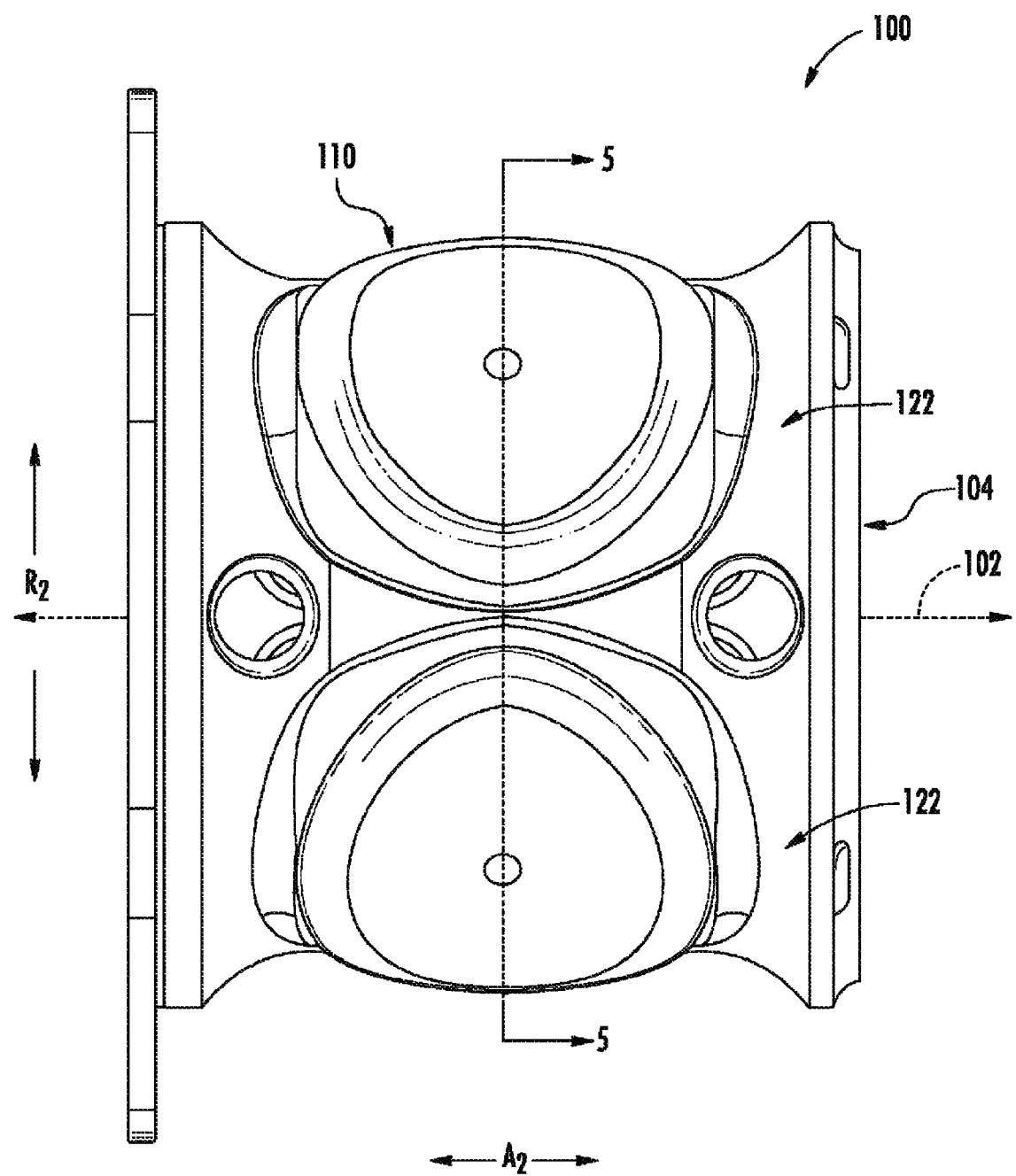
FIG. 2 illustrates a side view of one embodiment of a bearing assembly according to the present disclosure.
Figure 3:
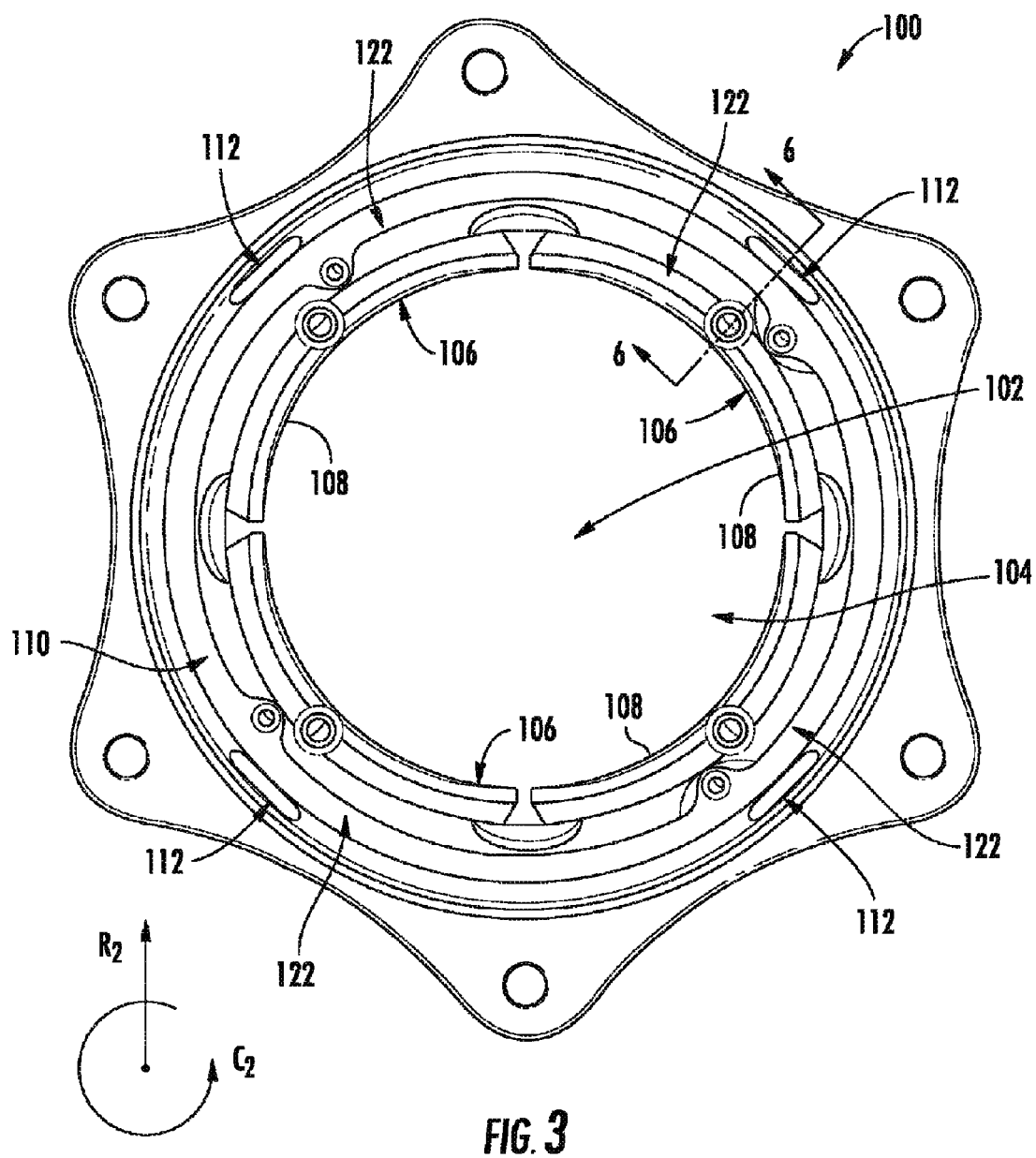
FIG. 3 illustrates an end view of the bearing assembly of FIG. 2.
Figure 4:
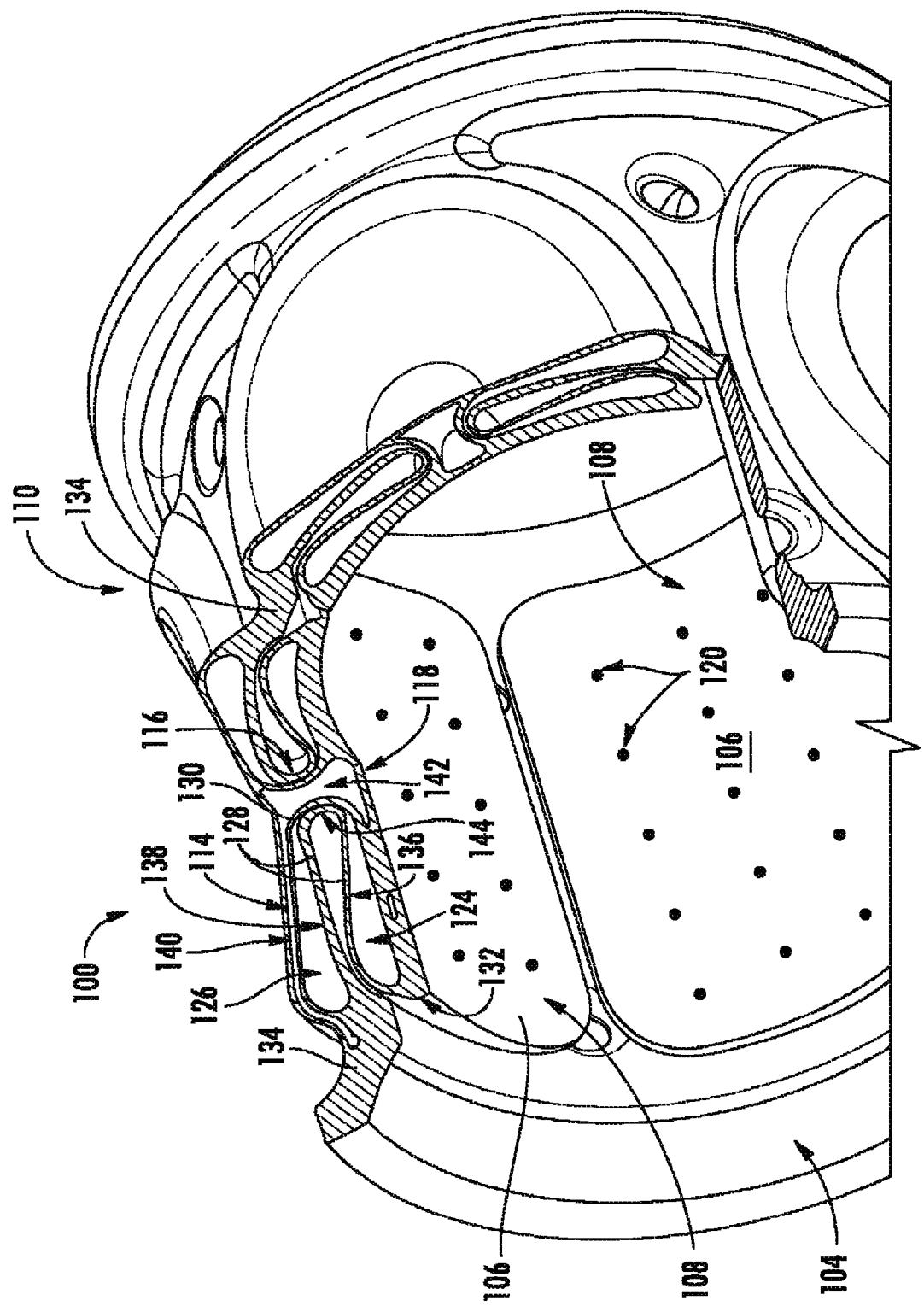
FIG. 4 illustrates a perspective, cutaway view of the bearing assembly of FIG. 2.

Referring now to FIGS. 2 through 4, a bearing assembly 100 in accordance with an exemplary embodiment of the present disclosure is illustrated. More specifically, FIG. 2 illustrates a side view of one embodiment of a bearing assembly 100 according to the present disclosure; FIG. 3 illustrates an end view of the bearing assembly 100 of FIG. 2; and FIG. 4 illustrates a perspective, cut-away view of the bearing assembly 100 of FIG. 2. In certain embodiments, the bearing assembly 100 may be incorporated into the exemplary gas turbine engine 10 described above with reference to FIG. 1, or alternatively, the bearing assembly 100 may be incorporated into any other suitable gas turbine engine or turbomachine.

As shown, the bearing assembly 100 generally defines an axial direction A2 (and a central axis 102 extending generally along the axial direction A2), a radial direction R2, and a circumferential direction C2. Further, the bearing assembly 100 defines an axial opening 104 and is configured to support a rotary component, e.g., of the gas turbine engine 10, within the axial opening 104. Further, the bearing assembly 100 generally includes one or more bearing pads 106, each defining inner and outer surfaces 108, 109 for supporting the rotary component and a housing 110 attached to or formed integrally with the bearing pad(s) 106. In addition, the bearing assembly 100 is configured as an "air" bearing, or oil-free/oil-less bearing, and accordingly the housing 110 is generally configured to provide the inner surfaces 108 of the one or more bearing pads 106 with a flow of a working gas (e.g., air, compressed air and combustion gases, or the like) during operation to create separation with the rotary component and provide a low friction means for supporting such rotary component (not depicted).

As such, the housing 110 of the bearing assembly 100 includes a gas inlet 112 (FIG. 3) at a first end along the axial direction A2 and a supply channel 114 (FIG. 4) extending from the gas inlet 112 to a column 116. The column 116 is configured to provide the bearing pad 106 with a flow of the working gas from the supply channel 114, as will be discussed in greater detail below. Additionally, as shown, the column 116 extends towards the bearing pad 106 and supports the bearing pad 106. More specifically, as shown in the illustrated embodiment, the column 116 fully supports the bearing pad 106. Further, as shown, the column 116 is located approximately at a center of the bearing pad 106. More particularly, the bearing pad 106 defines a center 118, and the column 116 is at least partially attached to or formed integrally with the bearing pad 106 proximate the center 118 of the bearing pad 106. However, in other embodiments, the column 116 may instead be positioned off-center from the bearing pad 106.

In certain embodiments, the bearing pad 106 may be configured to disperse and/or diffuse the working gas to support and/or lubricate the rotary component during operation of the bearing assembly 100, which will be described in more detail in reference to FIGS. 9-12. In such manner, the bearing assembly 100 may provide a hydrostatically pressurized compliant bearing pad. For example, as shown, the bearing pad 106 includes a plurality of gas distribution holes 120 disposed across the bearing pad 106 to provide an evenly distributed pressure field within the axial opening 104 for supporting and/or lubricating the rotary component.

The plurality of gas distribution holes 120 may be configured having any dimensions or arrangements (e.g., array, pattern or configuration) suitable to function as described herein. For example, in some embodiments, the plurality of gas distribution holes 120 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, each bearing pad 106 may have a sufficiently high gas permeability to permit the working gas received from the column 116 to generate sufficient pressure within the axial opening 104 to provide the support and/or lubrication of the rotary component.

Figure 5:
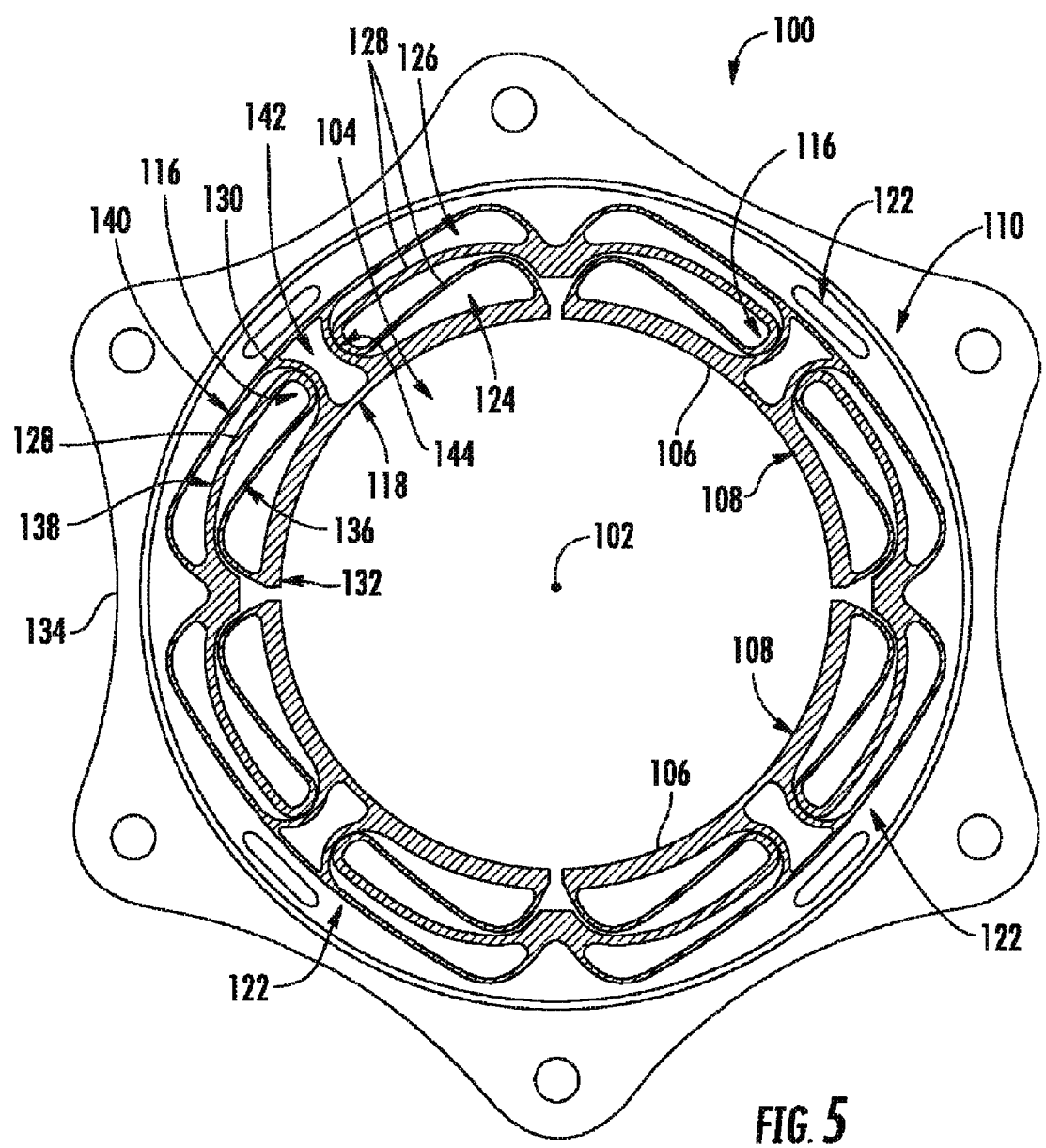
FIG. 5 illustrates a cross-sectional view of the bearing assembly of FIG. 2, taken along line 5-5.

Furthermore, as shown in FIG. 5, the bearing assembly 100 includes a plurality of sections 122 spaced along the circumferential direction C2 of the bearing assembly 100. Each section 122 may generally include a bearing pad 106 (e.g., configured in the same manner described above) and a respective portion of the housing 110 configured as a damper assembly. Accordingly, as may be seen most clearly in, e.g., FIG. 3, the bearing assembly 100 includes a plurality of bearing pads 106 substantially evenly spaced along the circumferential direction C2. Further, each of the bearing pads 106 defines a respective inner surface 108, with the inner surfaces 108 of the plurality of bearing pads 106 together defining a substantially annular support surface along the circumferential direction C2 (see, e.g., FIG. 3) and a linear support surface along the axial direction A2 (see, e.g., FIG. 6, discussed below) for supporting a rotary component.

The bearing pads 106 may be fabricated from any material suitable to withstand the working conditions of the bearing assembly 100. In addition, in some embodiments, the bearing pads 106 are fabricated from a material having a sufficiently low porosity to prevent instabilities in the thin gas film created between bearing pads 106 and the rotary component during operation of, e.g., the turbomachine. For example, in some embodiments, the bearing pads 106 may be fabricated from porous carbons, such as carbon graphite, sintered porous ceramics, and sintered porous metals, such as Inconel® and stainless steel.

Moreover, in some embodiments, the bearing pad 106 and the housing 110 of each section 122 may be formed integrally of a single, continuous material. For example, in some embodiments, each of the bearing pads 106 may be formed integrally with the housing 110 of the respective section 122 of the bearing assembly 100, such that the bearing pad 106 and housing 110 of the respective section 122 are fabricated to form a single integral part. Further, in certain embodiments, a plurality of bearing pads 106 and respective portions of the housing 110 forming two or more sections 122 may be formed integrally, or further still, each of the plurality of bearing pads 106 and respective portions of the housing 110 forming the bearing assembly 100 may be formed integrally.

The bearing pads 106 and the housing 110 may be fabricated via any technique suitable to facilitate forming the integral part depicted and described below. For example, in some embodiments, the bearing pads 106 and the housing 110 may be fabricated using an additive manufacturing process (also known as rapid prototyping, rapid manufacturing, and 3D printing), such as selective laser sintering (SLS), direct metal laser sintering (DMLS), electron beam melting (EBM), diffusion bonding, or selective heat sintering (SHS). It should be appreciated, however, that in other embodiments one or more of the bearing sections 122, including a bearing pad 106 and a respective portion of the housing 110, may be formed integrally of a single, continuous material and joined to separately formed, adjacent bearing sections 122 in any other suitable manner, such as through a mechanical fastening means.

Figure 6:
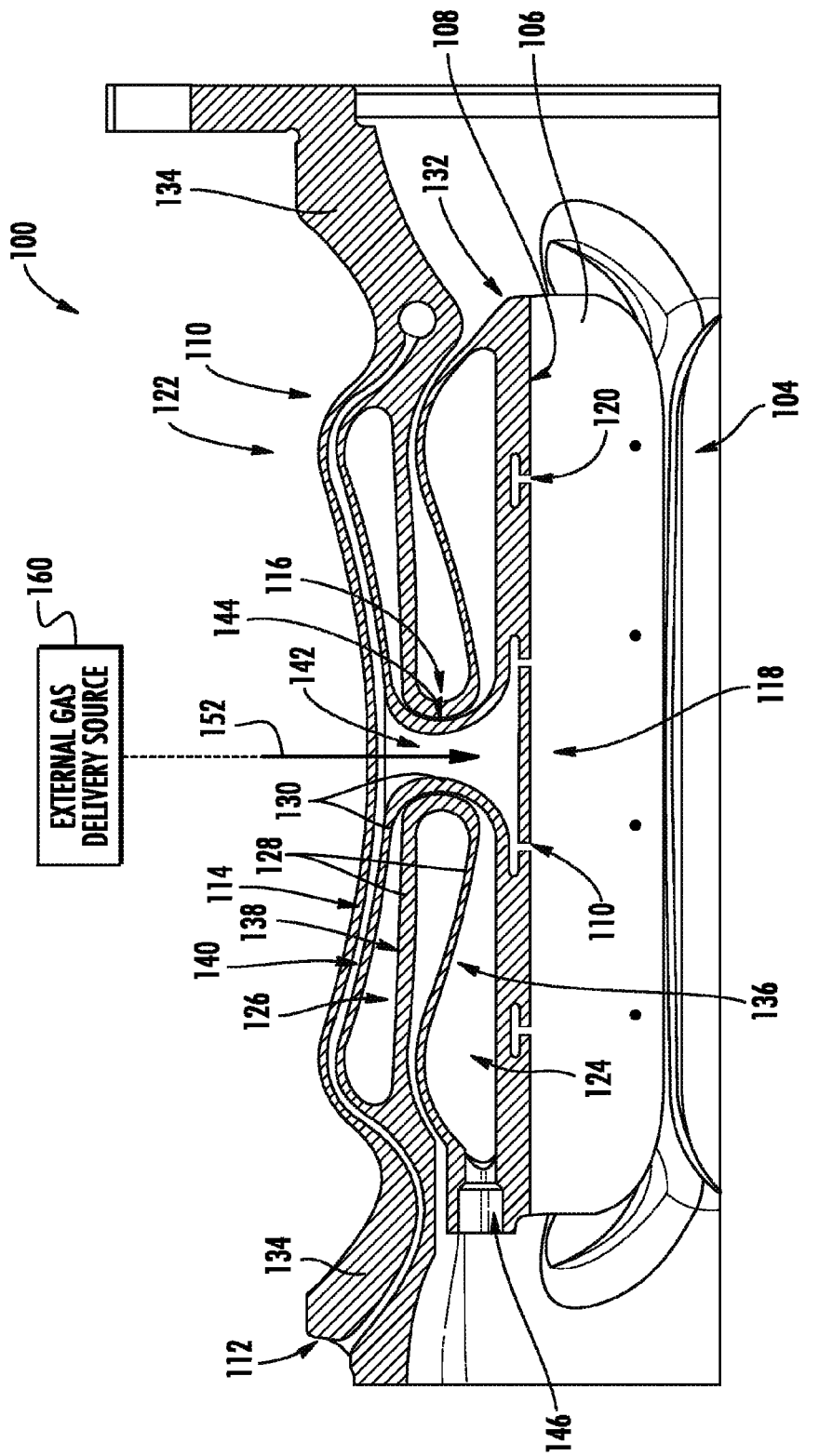
FIG. 6 illustrates a cross-sectional view of the bearing assembly of FIG. 2, taken along line 6-6.

Referring now to FIG. 4, and also to FIGS. 5 and 6 providing cross-sectional views of the bearing assembly 100 (along line 5-5 in FIG. 2 and line 6-6 in FIG. 3, respectively), as briefly noted above each of the bearing sections 122 includes a portion of the housing 110 configured as a damper assembly. More particularly, as shown, the housing 110 at least partially defines a first fluid damper cavity 124 and a second fluid damper cavity 126. For example, in certain embodiments, the first fluid damper cavity 124 and the second fluid damper cavity 126 each extend three hundred and sixty degrees (360) around the column 116. Additionally, the first fluid damper cavity 124 is positioned adjacent to the bearing pad 106 and the second fluid damper cavity 126 is spaced from the first fluid damper cavity 124, or more particularly, is spaced from the first fluid damper cavity 124 along the radial direction R2.

Further, as shown, the portion of the housing 110 configured as a damper assembly for each bearing section 122 generally includes a first, outer wall 128 and a second, inner wall 130. In addition, the inner wall 130 and outer wall 128 are configured as a serpentine inner wall 130 and a serpentine outer wall 128 (i.e., a wall extending in a variety of directions), respectively. For example, the bearing pad 106 generally defines an outer periphery 132. The serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A2, and subsequently extends back away from the center 118 of the bearing pad 106 along the axial direction A2, connecting with a body 134 of the housing 110. Similarly, as shown, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R2, and subsequently extends away from the center 118 of the bearing pad 106 along the axial direction A2, also connecting with the body 134 of the housing 110.

Further, the outer wall 128 generally includes a semi-rigid portion 136 and a rigid portion 138, and similarly the inner wall 130 includes a semi-rigid portion 140. As shown, the outer wall 128 at least partially defines the first fluid damper cavity 124 and at least partially defines the second fluid damper cavity 126. Additionally, the bearing pad 106 at least partially defines the first fluid damper cavity 124, and the inner wall 130 at least partially defines the second fluid damper cavity 126. More particularly, as shown, the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a portion of a component of the bearing assembly 100 described as semi-rigid may be configured to bend, flex, or give way prior to a portion of a component of the bearing assembly 100 described as rigid. For example, the semi-rigid portions of the various components may be created by forming such portions with a lesser thickness as compared to the rigid portions of such components. Further, a component of the bearing assembly 100 described as "semi-rigid" herein refers to a component configured to bend, flex, or give way during normal operation of the bearing assembly 100 while incurring little or no damage.

Additionally, the first fluid damper cavity 124 is in flow communication with the second fluid damper cavity 126 through a portion of the column 116. Specifically, the column 116 depicted is configured as a double-walled column 116 formed from a portion of the inner wall 130 and a portion of the outer wall 128. Accordingly, the column 116 is supported at a radially outer end by the rigid portion 138 of the outer wall 128 and the semi-rigid portion 140 of the inner wall 130. Further, at a radially inner end the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, the inner wall 130 defines an axially inner channel 142 for providing the bearing pad 106 with the working gas, and the outer wall 128 and inner wall 130 together define an axially outer channel 144. As will be appreciated, the axially outer channel 144 is concentric with the axially inner channel 142 and defines a substantially annular shape around the axially inner channel 142. Further, for the embodiment depicted, the axially outer channel 144 is configured as a clearance gap, such that the first fluid damper cavity 124 and the second fluid damper cavity 126 are in restrictive flow communication through the axially outer channel 144.

Further, the first fluid damper cavity 124, second fluid damper cavity 126, and outer channel 144 are all sealed together, and together define a fixed volume. Moreover, the housing 110 defines a damper cavity supply 146 (FIG. 6) for filling the first and second fluid damper cavities 124, 126 with a dampening fluid, such that during operation, the first and second fluid damper cavities 124, 126 and outer channel 144 are each completely filled with the dampening fluid. A cap or other removable or permanent closure means may be positioned over the damper cavity supply 146 after the cavities are filled. The dampening fluid may be, e.g., an oil, such as heat transfer oil, or alternatively may be any other suitable fluid, such as any suitable incompressible liquid. The bearing assembly 100 is configured to transfer the damper fluid from the first fluid damper cavity 124, through the outer channel 144/clearance gap, and to the second fluid damper cavity 126 in response to a force acting on the bearing pad 106.

Figure 7:
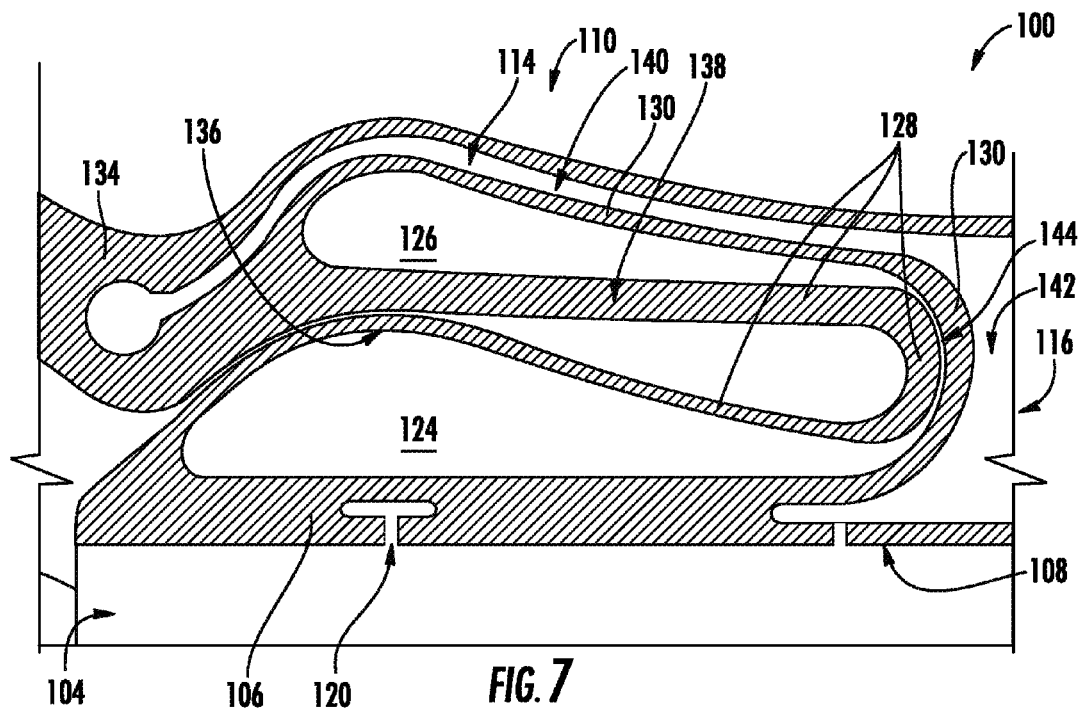
FIG. 7 illustrates a close-up, cross-sectional view of the bearing assembly of FIG. 2, particularly illustrating the bearing assembly in a depressed state.
Figure 8:
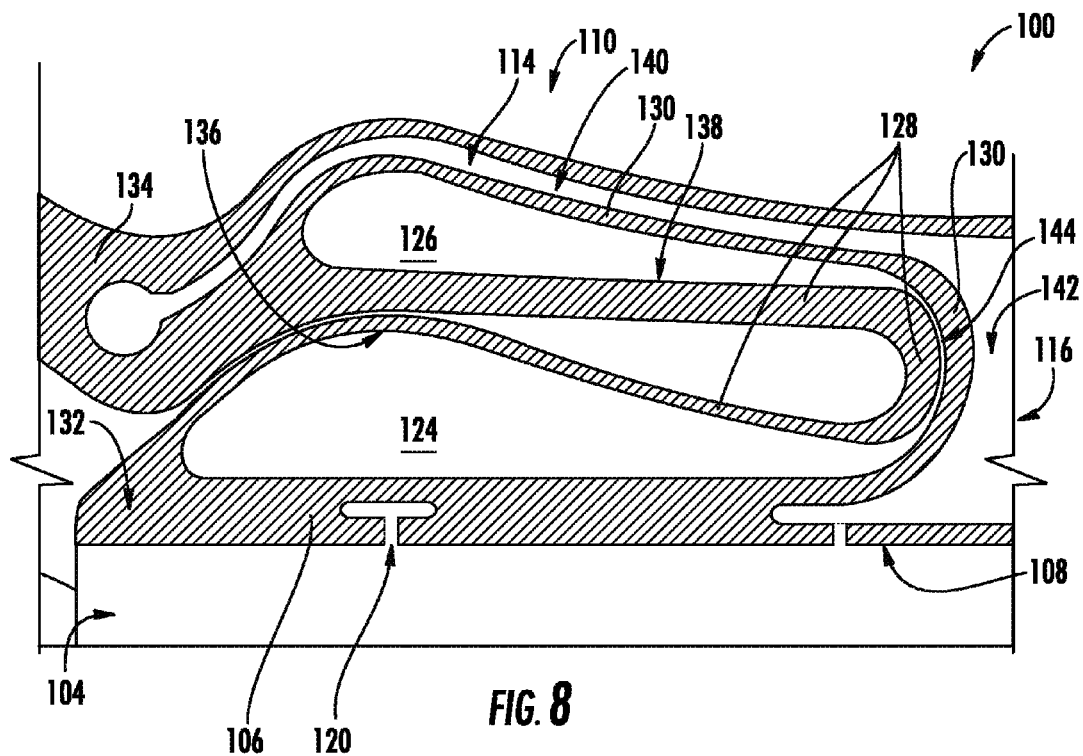
FIG. 8 illustrates a close-up, cross-sectional view of the bearing assembly of FIG. 2, particularly illustrating the bearing assembly in an extended state.

Referring now to FIGS. 7 and 8, side, cross-sectional views of a portion of the bearing assembly 100 are illustrated. More specifically, FIG. 7 illustrates a side, close-up, cross-sectional view of the bearing assembly 100 of the present disclosure having absorbed a force acting on the bearing pad 106, whereas FIG. 8 illustrates a side, close-up, cross-sectional view of the bearing assembly 100 without a force acting on the bearing pad 106.

When a force acts on the bearing pad 106, such as when a rotary component supported by the bearing assembly 100 presses on the bearing pad 106 generally along the radial direction R2, the portion of the housing 110 forming the damper assembly allows for the bearing pad 106 to move along the radial direction R2, absorbing such force. More particularly, as the column 116 supporting the bearing pad 106 moves up, the semi-rigid portion 136 of the outer wall 128 partially deforms (decreasing a volume of the first fluid damper cavity 124), a portion of the damping fluid within the first fluid damper cavity 124 is forced through the outer channel 144 of the column 116, configured as a clearance gap, and flows into the second fluid damper cavity 126. At the same time, the rigid portion 138 of the outer wall 128 remains substantially stationary, and the semi-rigid portion 140 of the inner wall 130 partially deforms to increase a volume of the second fluid damper cavity 126 and accept the portion of the dampening fluid provided through the outer channel 144 of the column 116 from the first fluid damper cavity 124. Such movement absorbs the force exerted on the bearing pad 106, and dampens such movement. For example, the relatively tight clearance of the outer channel 144/clearance gap resists relatively quick movement of the bearing pad 106 along the radial direction R2. In the absence of the force exerted on the bearing pad 106, the dampening fluid transferred to the second fluid damper cavity 126 may reverse in flow direction, and flow back through the outer channel 144 of the column 116 to the first fluid damper cavity 124 (FIG. 8).

Referring to FIGS. 9-12, various embodiments of the bearing pad 106 for supporting a rotary component of the gas turbine engine 10 are illustrated according to the present disclosure. As shown, the bearing pad 106 includes at least one gas inlet 112 and a plurality of gas outlets 120 or distribution holes configured on an inner surface 108 thereof. Further, as shown, the gas inlet 112 is in fluid communication with the plurality of gas outlets 120 via a gas distribution labyrinth 156 or path. Moreover, as shown, the gas distribution labyrinth 156 includes a plurality of passageways 158 configured to evenly distribute pressurized gas 152 entering the gas inlet 112 to an interface between the inner surface 108 of the bearing pad 106 and an outer diameter of the rotary component, i.e. rotating shafts 34, 36 of the gas turbine engine 10. In addition, as shown in FIG. 6, the bearing assembly 106 may also include an external gas delivery source 160 configured to deliver the pressurized gas 152 to the gas inlet 112 and/or the inner channel 142 of the column 116.

Figure 9:
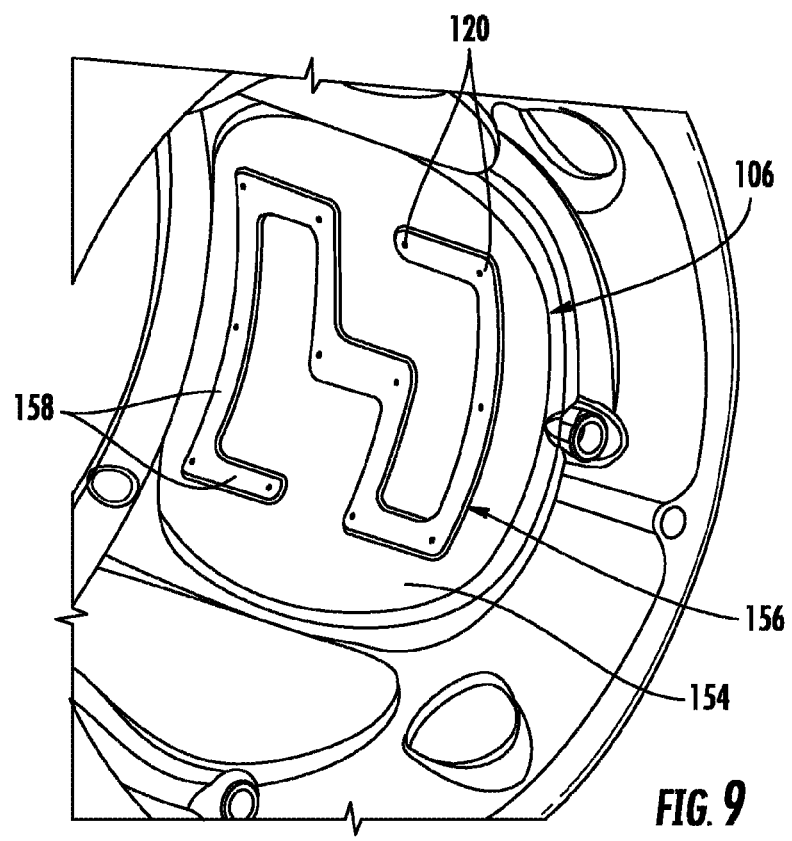
FIG. 9 illustrates a detailed, perspective view of one embodiment of a bearing pad of a bearing assembly having a gas distribution labyrinth according to the present disclosure, particularly illustrating a zig-zag pattern of the gas distribution labyrinth.
Figure 10:
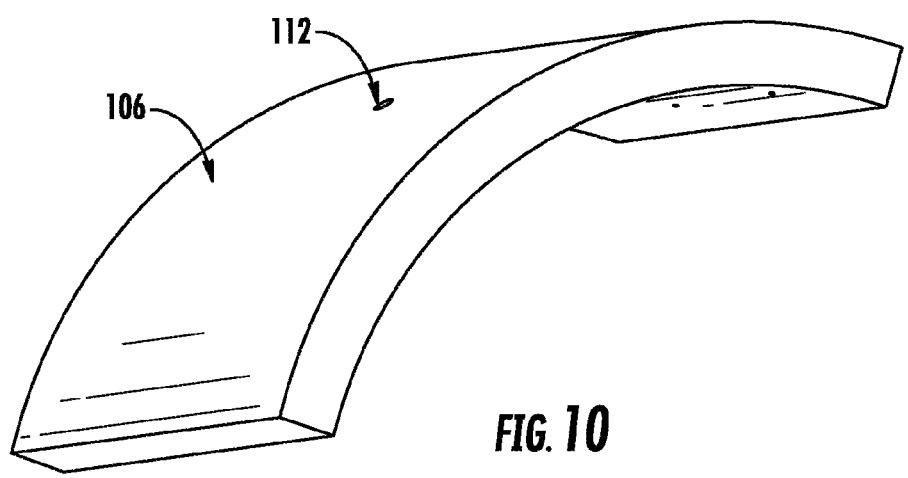
FIG. 10 illustrates a partial, perspective view of one embodiment of a bearing pad of a bearing assembly according to the present disclosure, particularly illustrating the gas inlet of the bearing pad.
Figure 12:
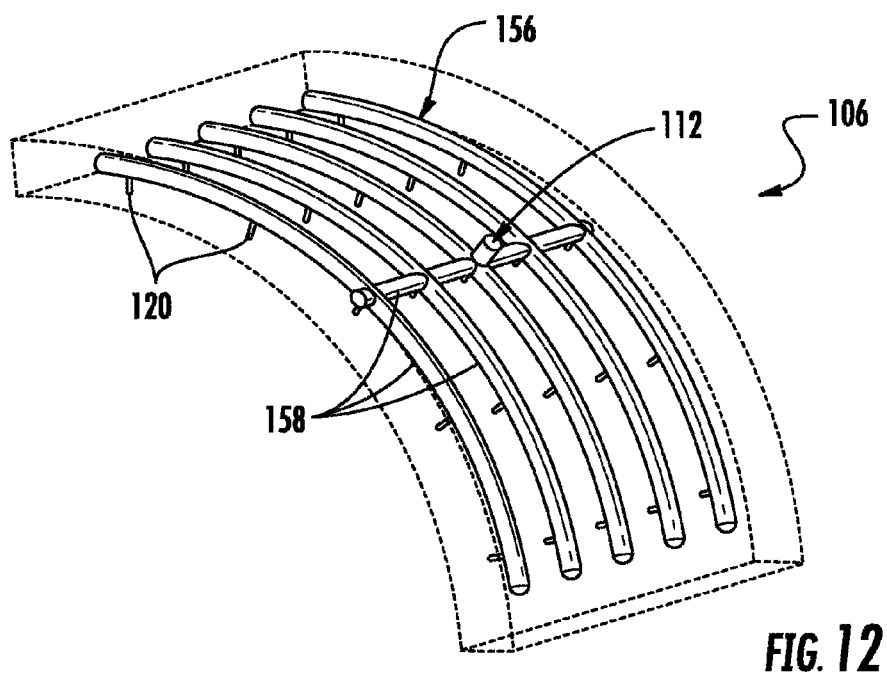
FIG. 12 illustrates a detailed, perspective view of one embodiment of a bearing pad of a bearing assembly having a gas distribution labyrinth according to the present disclosure, particularly illustrating a grid pattern of the gas distribution labyrinth.

Referring specifically to FIGS. 9 and 12, the gas distribution labyrinth 156 may define any suitable predetermined pattern. For example, as shown in FIG. 9, the gas distribution labyrinth 156 has a zig-zag pattern, whereas FIG. 12 illustrates a grid pattern. In certain embodiments, the zig-zag pattern is particularly useful for providing higher bearing pad stiffness. In still further embodiments, the gas distribution labyrinth 156 may have any other pattern including but not limited to various shapes, letters, or similar. As mentioned, such patterns can be easily achieved in the bearing pad 106 by using advanced manufacturing, such as additive manufacturing. Thus, the gas distribution labyrinth 156 can be generated without cross drilling or the use of plugs.

Figure 11:
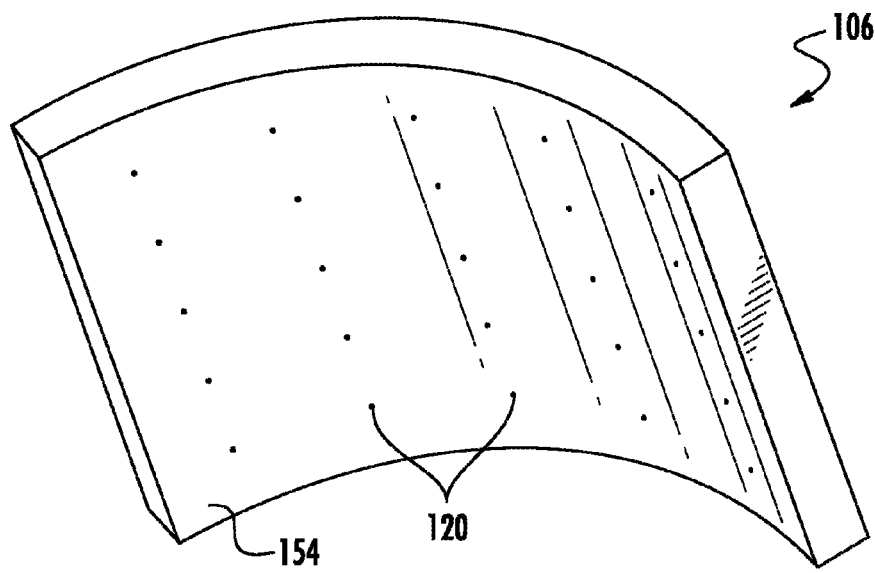
FIG. 11 illustrates a partial, perspective view of one embodiment of a bearing pad of a bearing assembly according to the present disclosure, particularly illustrating the gas outlets of the bearing pad.

In further embodiments, as shown in FIGS. 4 and 11-12, the plurality of gas outlets 120 may be evenly spaced on the inner surface 108 of the bearing pad 106. Alternatively, as shown in FIG. 9, the plurality of gas outlets 120 may be randomly spaced on the inner surface 108 of the bearing pad 106. Further, the location and/or pattern of the gas outlets 120 may be chosen as a function of, the gas distribution labyrinth pattern or independently of the, the gas distribution labyrinth pattern.

Figure 13:
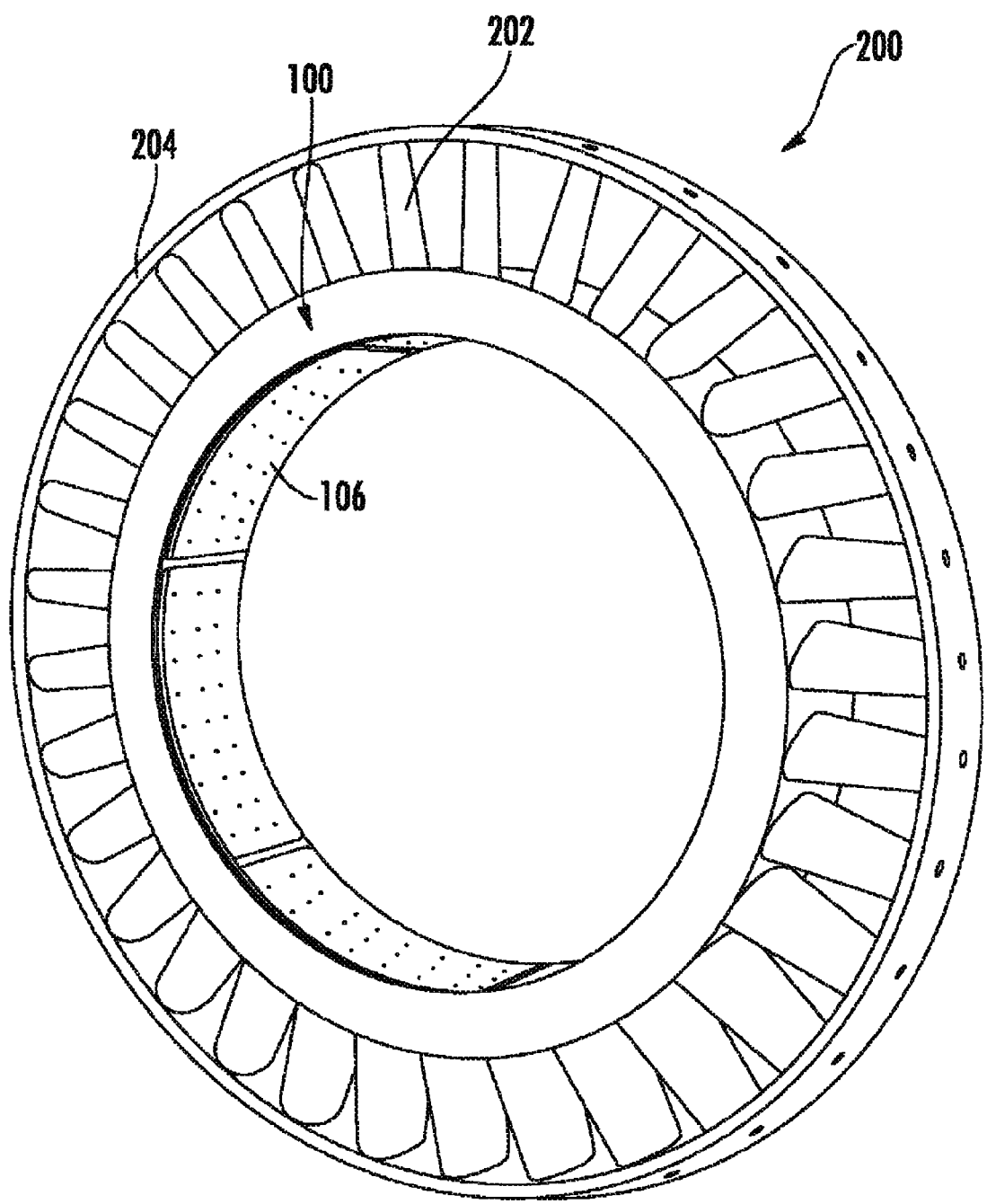
FIG. 13 illustrates a perspective view of one embodiment of a bearing assembly incorporated into a turbine nozzle according to the present disclosure.

Referring now to FIG. 13, the bearing assembly 100 described herein may be integrated into a turbine nozzle 200 of an aircraft engine. In such embodiments, guide vanes 202 of the nozzle 200 may be disposed between, and supported by, the housing 110 of the bearing assembly 100 and an outer ring 204 of the turbine nozzle 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a gas turbine engine, the bearing assembly comprising:
   a bearing housing; and
   a bearing pad for supporting a rotary component of the gas turbine engine, the bearing pad comprising at least one gas inlet configured on an outer surface of the bearing pad and a plurality of gas outlets configured on an inner surface the bearing pad, the gas inlet in fluid communication with the plurality of gas outlets via a gas distribution labyrinth, the gas distribution labyrinth comprising a plurality of passageways configured to evenly distribute pressurized gas entering the gas inlet to an interface between the inner surface of the bearing pad and an outer diameter of the rotary component,
   wherein the bearing housing comprises a column extending towards the bearing pad and defining an axially inner channel for providing the gas inlet of the bearing pad with the pressurized gas and an axially outer channel concentric with the axially inner channel.

2. The bearing assembly of claim 1, wherein the plurality of gas outlets are evenly spaced on the inner surface of the bearing pad.

3. The bearing assembly of claim 1, wherein the plurality of gas outlets are randomly spaced on the inner surface of the bearing pad.

4. The bearing assembly of claim 1, wherein the bearing pad is attached to the bearing housing.

5. The bearing assembly of claim 1, wherein the bearing pad and the bearing housing are formed integrally of a single, continuous material.

6. The bearing assembly of claim 1, wherein the bearing pad and the bearing housing are formed using an additive manufacturing process.

7. The bearing assembly of claim 1, further comprising an external gas delivery source configured to deliver the pressurized gas to the gas inlet.

8. The bearing assembly of claim 1, wherein the bearing housing further comprises a plurality of bearing pads spaced along a circumferential direction of the bearing housing.

9. The bearing assembly of claim 1, wherein the gas distribution labyrinth comprises at least one of a zig-zag pattern or a grid pattern.

10. The bearing assembly of claim 1, wherein the gas turbine engine comprises an aircraft gas turbine engine.

11. A bearing pad for a bearing assembly of a gas turbine engine, the bearing pad comprising:
    at least one gas inlet configured on an outer surface of the bearing pad and in fluid communication with a column defining an axially inner channel for providing the gas inlet of the bearing pad with a pressurized gas and an axially outer channel concentric with the axially inner channel;
    a plurality of gas outlets configured on an inner surface of the bearing pad; and
    a gas distribution labyrinth having a zig-zag pattern, the gas inlet in fluid communication with the plurality of gas outlets via the gas distribution labyrinth, the gas distribution labyrinth comprising a plurality of passageways configured to evenly distribute pressurized gas entering the gas inlet to an interface between the inner surface of the bearing pad and an outer diameter of the rotary component.

12. The bearing pad of claim 11, wherein the plurality of gas outlets are evenly spaced on the inner surface of the bearing pad.

13. The bearing pad of claim 11, wherein the plurality of gas outlets are randomly spaced on the inner surface of the bearing pad.

14. The bearing pad of claim 11, wherein the bearing pad is formed using an, additive manufacturing process.

15. The bearing pad of claim 11, wherein the gas turbine engine comprises an aircraft gas turbine engine.

16. A gas turbine engine assembly, comprising:
    a rotary component;
    a bearing housing;
    a bearing pad for supporting the rotary component, the beating pad comprising at least one gas inlet configured on an outer surface of the bearing pad and a plurality of gas outlets configured on an inner surface the bearing pad, the gas inlet in fluid communication with the plurality of gas outlets via a gas distribution labyrinth having a zigzag pattern, the gas distribution labyrinth comprising a plurality of passageways configured to evenly distribute pressurized gas entering the gas inlet to an interface between the inner surface of the bearing pad and an outer diameter of the rotary component; and an external gas delivery source configured to deliver the pressurized gas to the gas inlet, wherein the bearing housing comprises a column extending towards the bearing pad and defining an axially inner channel for providing the gas inlet of the bearing pad with the pressurized gas and an axially outer channel concentric with the axially inner channel.

17. The gas turbine engine assembly of claim 16, wherein the rotary component comprises one or more rotating shafts.

\* \* \* \* \*